United States Patent Office 2,959,010
Patented Nov. 8, 1960

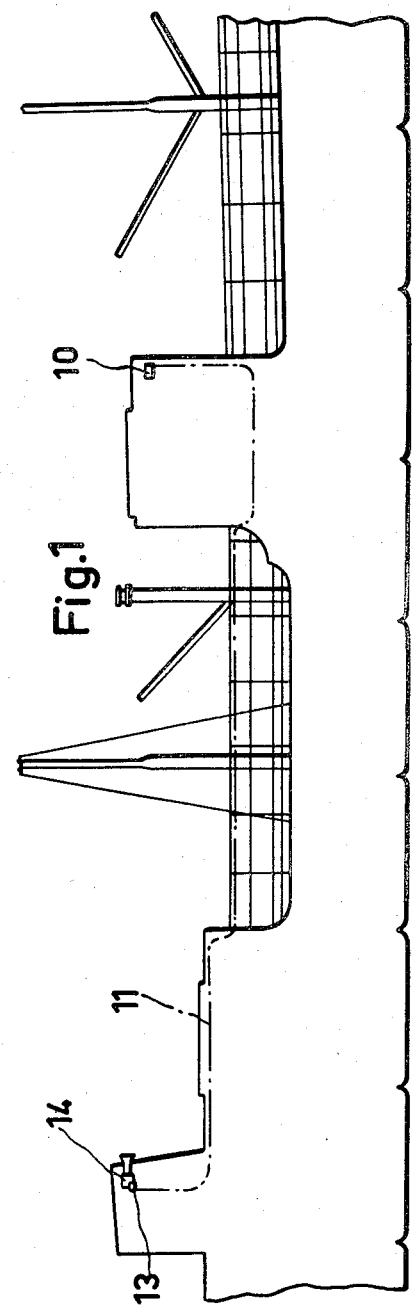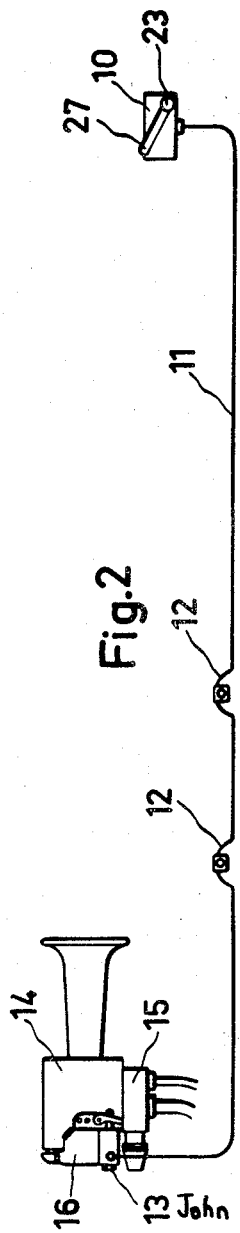
John G. M. BRODÉN
Nils A.V. DAHLQVIST
INVENTORS

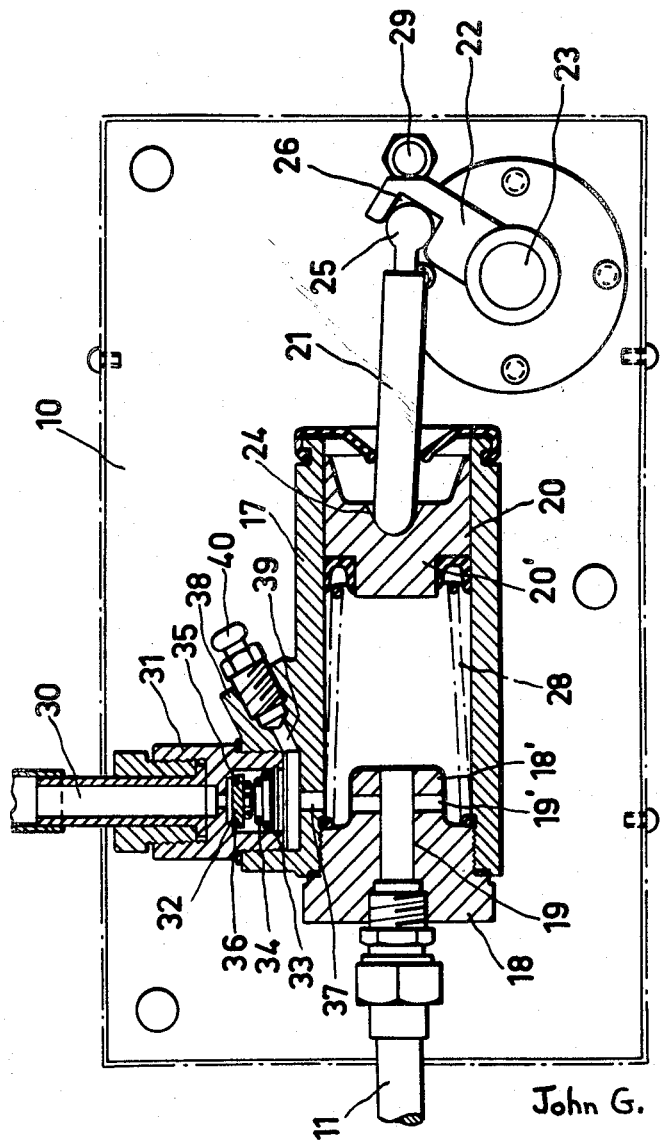

2,959,010

HYDRAULIC SERVO SYSTEMS FOR OPERATING THE CONTROL VALVE OF PRESSURE FLUID OPERATED WHISTLES

John Gustaf Mauritz Brodén and Nils Axel Viktor Dahlqvist, Malmö, Sweden, assignors to Kockums Mekaniska Verkstads Aktiebolag, Malmö, Sweden, a corporation of Sweden Filed Aug. 18, 1958, Ser. No. 755,489

Claims priority, application Sweden Feb. 17, 1958

10 Claims. (Cl. 60—54.5)

This invention relates to a hydraulic servo system for operating the control valve of pressure fluid operated whistles. The servo system according to the invention is of the type including a manually operable transmitter, a receiver adapted to be operatively connected with the control valve, a single conduit maintaining the transmitter and the receiver in constant communication with each other, a reservoir for hydraulic fluid, and check valve means regulating the communication between the reservoir and the system provided by the transmitter, the conduit and the receiver, said check valve means normally occupying open position thus allowing expansion and contraction of the hydraulic fluid in the servo system caused by temperature changes, and being adapted to be brought to closed position by the pressure of the hydraulic fluid in said system when the transmitter is actuated to increase the hydraulic pressure in said system.

Certain disadvantages have been met with in the practical use of such servo systems. Hydraulic fluid may be sucked by the transmitter into the hydraulic system past the check valve means from the reservoir when the transmitter is repetitively actuated in rapid sequence for emitting successive signals from the whistle, and in that case the receiver may remain with the control valve open despite the fact that the transmitter occupies the position corresponding to the control valve being closed, whereby the servo system will be blocked, the whistle thus sounding continuously. Furthermore, it has proved difficult to prevent corrosion in the cylinder bore of the receiver as said bore is easily attacked by salt-containing air passing through the aperture provided for the piston rod so that there is an overwhelming risk that the receiver will be put out of operation.

These disadvantages are eliminated by the present invention which provides a hydraulic servo system for operating the control valve of pressure fluid operated whistles, including a manually operable transmitter, a receiver comprising a hydraulic cylinder, a piston reciprocable in the bore of said cylinder, said bore being normally closed to the atmosphere on each side of said piston, and a piston rod associated with said piston and adapted to be operatively connected with said control valve, said piston being slidable on said piston rod between two extreme positions, and further including means maintaining said bore in constant communication with the transmitter on one side of said piston, a reservoir for hydraulic fluid, means maintaining said reservoir in constant communication with said bore on the other side of said piston, check valve means provided by said piston, regulating the communication between the reservoir and the receiver through said bore, means resiliently biasing said piston to one of said extreme piston positions located adjacent said one side, said piston being displaceable to the other one of said extreme positions by hydraulic fluid pressure manually produced in said system by said transmitter for actuating the control valve and said check valve means maintaining said communication through said bore open in said one extreme position and closed in said other position.

For a better understanding, the invention will be described more in detail in the following, reference being had to the accompanying drawings illustrating a preferred embodiment of the invention. In the drawings:

Fig. 1 is a view showing the contours of part of a ship, wherein the hydraulic servo system according to the invention is diagrammatically indicated.

Fig. 2 is an enlarged connection diagram for the hydraulic system.

Fig. 3 is an axial sectional view of the transmitter, on a still larger scale.

Figure 4:
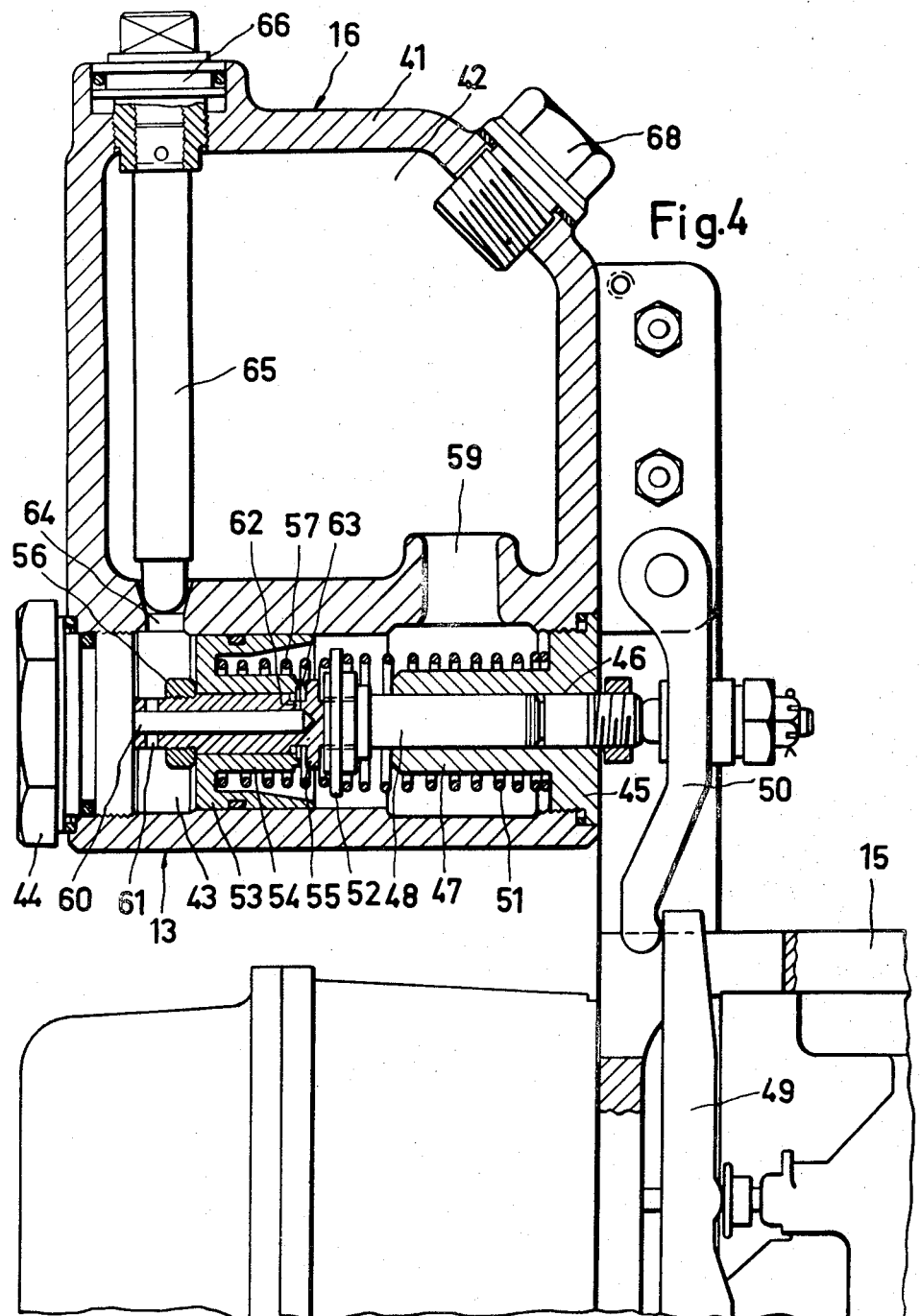
Fig. 4 is a sectional view, corresponding to Fig. 3, of the receiver with the reservoir shown in sectional view and part of the control valve shown in elevation.

As shown in Figs. 1 and 2, the system according to the invention comprises a transmitter 10 connected by means of a single conduit 11 with expansion bends 12 to a receiver 13, which is disposed on a whistle 14 mounted on the ship's funnel, and is operatively connected to a control valve 15 built into, or integral with the whistle 14 to regulate the admission of steam or air to said whistle. The receiver 13 and through this the remaining hydraulic system is connected to a reservoir 16 for hydraulic fluid, integral with the receiver 13.

For a more detailed description of the transmitter 10, reference is now made to Fig. 3 in the drawings. The transmitter comprises a cylinder 17 and a piston 20 movable therein. The cylinder 17 is closed at one end by a plug 18 screwed thereinto and having a through bore 19 which is connected to the conduit 11. The piston 20 is operatively connected by a pressure rod 21 to an arm 22 which is non-rotatably secured to a rotatably mounted shaft 23, said pressure rod having one end spherically rounded and mounted in a recess 24 in the piston 20, the other end being formed with a ball 25 and mounted in a recess 26 in the arm 22. In addition, the shaft 23 is non-rotatably connected to an operating handle 27, as seen in Fig. 2. Inserted in the cylinder 17 between the piston 20 and the plug 18 is a pressure spring 28 which, together with the hydraulic pressure possibly existing in the cylinder, tends to move the piston 20 to the right in the cylinder 17 so that the arm 22, if no pressure is exerted on the operating handle 27, is held pressed against a stationary abutment 29, the piston 20 occupying a right-hand extreme position. When the operating handle 27 is oscillated manually, the piston 20 is reciprocated in the cylinder 17 by the described arrangement, the piston 20 being returned towards the right-hand extreme position and engagement maintained between the parts 20, 21 and 22 by the pressure exerted on the side of the piston 20 opposed to the pressure rod 21. The left-hand extreme position of the piston 20 is defined by a projection 20' of reduced diameter on the piston 20 engaging a corresponding projection 18' on the plug 18, the annular space between the projections 18' and 20' and the interior surface of the cylinder 17 being sufficiently large to accommodate the compressed spring 28. The bore 19 communicates with the interior of the cylinder 17 also through a transverse passage 19' in the projection 18' in order that the bore 19 may not be entirely shut off from the interior of the cylinder when the piston bears against the projection 18' over the mouth of said bore opening into the cylinder.

Connected to the cylinder 17 is a conduit 30 which may be connected with a filling hopper or filling container (not shown) and the connection of which with the interior of the cylinder is regulated by a check valve comprising a valve body 31 and a valve disk 32 therein which is pressed by a conical pressure spring 34 inserted between said disk and an abutment 33 against a seat formed by a shoulder 35 in the valve body 31, a gasket ring 36 arranged on said valve disk providing a seal against said seat. Said check valve permits a flow from the conduit 30 into the cylinder 17 through a passage 37 provided in the wall of the cylinder, but prevents a flow in the opposite direction. A venting passage 39 for connecting the passage 37 with the atmosphere is provided in a socket 38 on the cylinder 17, said venting passage being normally closed by a plug 40 screwed thereinto.

The filling of the system may meet with certain difficulties if the fluid used in the system is oil, as is generally the case, since the oil as a rule is so viscous that at the filling of the system from the reservoir 16, which is the highest point of the system, there is the risk that air bubbles will remain in the conduit 11. As a result, the connection between the transmitter and receiver would become elastic, which must not occur. However, due to said check valve the filling of the conduit 11 can be effected by pumping the oil from the filling hopper or filling container into the conduit 11 from the transmitter 10, when the piston 20 is reciprocated in the cylinder 17, the oil being sucked into the cylinder 17 past the check valve at the movement of the piston 20 to the right as seen in Fig. 3, and pressed out of the cylinder and into the conduit 11 at the movement of the piston to the left, the check valve then closing the connection between the cylinder 17 and the conduit 30.

As seen in Fig. 4, the receiver 13 and the reservoir 16 are provided in a casting 41 forming a cavity 42 which is adapted to contain a supply of hydraulic fluid, and a cylinder bore 43 for the transmitter. This cylinder bore is in the form of a through bore which at both ends is sealed by plugs 44 and 45, the plug 45 being formed with a central bore 46 which on the inner side of the plug extends through a socket 47. The bore 46 serves to accommodate a piston rod 48 the outer end of which is operatively connected with the operating member 49 of the control valve 15 of the whistle by means of a suitable linkage 50. The piston rod is urged with its opposite or inner end into bearing engagement with the plug 44 by a pressure coil spring 51, the plug 49 thus serving as an abutment means for the piston rod. The control valve is closed with the piston rod in this position, i.e. the whistle is silent. The pressure coil spring 51 is wound around the socket 47 between the plug 45, this plug thus forming an abutment means for said spring, and an annular flange 52 on the piston rod 48. A piston 53 is mounted on the piston rod 48 and has sliding fit in a portion of the cylinder bore 43. This piston is not, however, rigidly connected to the piston rod 48 but is movably mounted with a sleeve portion 54 on the piston rod for movement (in the order of 1 or 2 mm.) between an annular flange 55 and a ring 56 screwed to the piston rod, the piston being urged into bearing engagement with said ring 56 by a pressure coil spring 57 which surrounds the sleeve portion 54 and is inserted between the annular flange 52 and the bottom of the piston. The pressure force exerted by the spring 57 is less than that exerted by the spring 51, possibly assisted by a pressure spring provided in the control valve 15.

The piston 53 also serves as a check valve means between the cylinder chambers on both sides of the piston. The cylinder chamber between the plug 44 and the piston 53 is connected, through a pipe connection 58 provided on the cylinder (Fig. 5), with the conduit 11 leading to the transmitter 10, while the cylinder chamber between the plug 45 and the piston in the space about the socket 47 is in communication with the cavity 42 through an opening 59. The connection between the two sides of the piston and thus between the cavity 42 and the conduit connected with the pipe connection 58 and leading to the transmitter consists of an axial bore 60 extending from the inner end of the piston rod 48 and leading to the annular flange 55. Adjacent the inner end of the piston rod the bore 60 communicates with the cylinder chamber through radial holes 61 in order that it may not be shut off from the cylinder chamber when the inner end of the piston rod 48 is in engagement with the plug 44, while the inner end of the bore 60 communicates through a narrow radial hole 62 (in the order of 1 or 2 mm.) with an annular groove 63 provided adjacent the annular flange 55, and thus with the cylinder chamber between the piston and the plug 45 when the piston in the extreme position shown is in engagement with the ring 56. Under such circumstances volume changes of the hydraulic fluid in the servo system, caused by temperature changes, are allowed by hydraulic fluid flowing out of or into the cavity 42. If the pressure in the conduit 11 connected to the pipe connection 58 is increased by actuation of the transmitter 10 a pressure increase immediately arises in the cylinder chamber between the plug 44 and the piston 53 because the flow of the pressure medium from said cylinder chamber through the holes 61, the bore 60, the hole 62 and the annular groove 63 to the opposite cylinder chamber and the cavity 42 is restricted to a large extent because of the small width of the hole 62. The result is that the piston is moved to its other extreme position in which the sleeve portion 54 bears against the annular flange 55, thus closing the annular groove 63 so that the communication between the two sides of the piston 53 is closed, whereupon the piston 53 and the piston rod 48 against the action of the spring 51 and the pressure spring possibly provided in the control valve 15 can move as a unit because of the pressure produced by the transmitter in the cylinder chamber between the plug 44 and the piston 53 to the right as seen in Fig. 4 to urge the control valve into open position so that the whistle is caused to sound. When the transmitter is moved back into its initial position, the piston 53 and the piston rod 48 are moved back, likewise as a unit, until the control valve is again closed, the piston being returned by spring 57 to its left-hand extreme position into bearing engagement with the ring 56. The piston thus in an excellent manner fulfils the function of a check valve means between the reservoir 16 and the receiver 13 but does not, however, tend, at repeated successive actuations, to hold the communication between the reservoir and the conduit open in such a way that hydraulic fluid is sucked by the transmitter into the hydraulic system between the transmitter and the receiver with the resulting risk of a blocking of said system.

Figure 5:
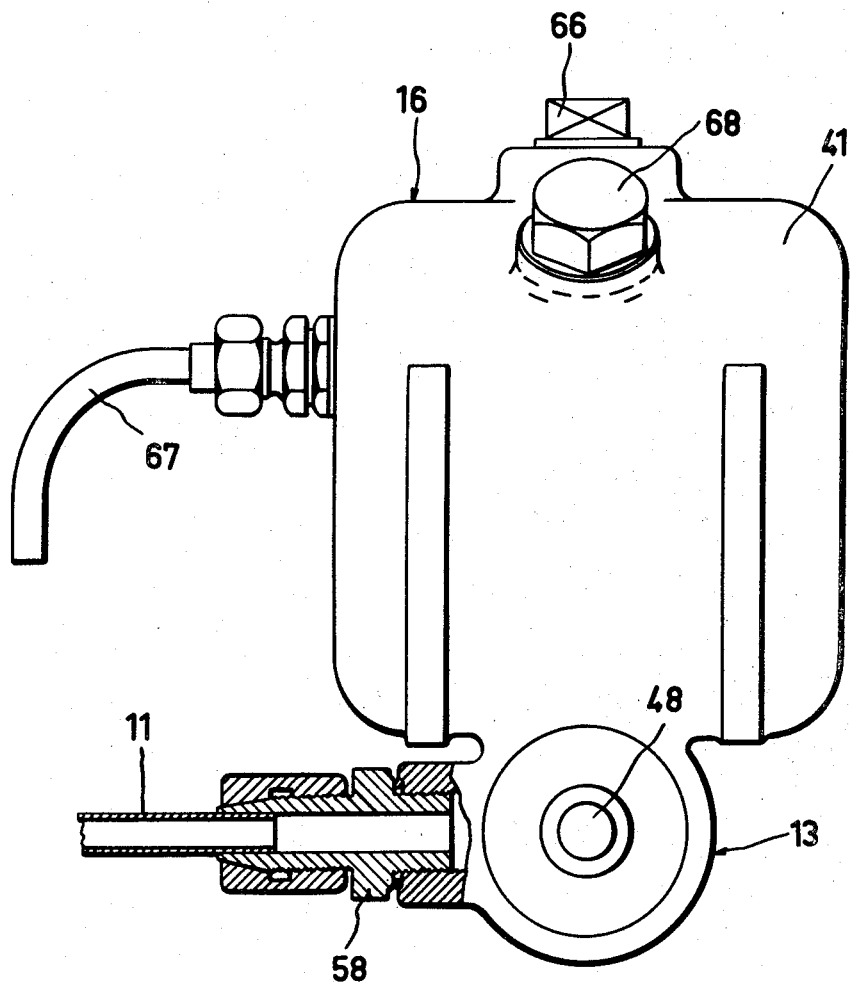
Fig. 5 is an elevational end view of the receiver and the reservoir, partly in section.

For venting the hydraulic system when it is filled from the transmitter in the manner described above the cylinder chamber existing between the plug 44 and the piston 53 and connected with the conduit 11 through the pipe connection 58, is connected to the cavity 42 by a bore 64 normally closed by a valve spindle 65 which is pressed thereinto and which is connected to a plug 66 screwed into a threaded opening in the casting 41 so that communication between said cylinder chamber and the atmosphere is established as the plug 66 and the valve spindle 65 connected thereto are screwed out of said threaded opening. A pipe 67, Fig. 5, is connected to the cavity 42 for supplying and discharging air at fluctuations of the oil level in the reservoir. For filling the cavity 42, as hydraulic fluid is consumed to some extent by reason of evaporation from the system through the pipe 67, a filler opening is provided which is closed by means of a screw plug 68.

It is appreciated that the cylinder bore on both sides of the piston 53 is always filled with hydraulic medium, preferably oil, and thus there is practically no risk that the piston sliding surface of the cylinder bore will corrode.

As the function of the system described has been outlined in connection with the description of the design of the system, it will not be necessary to give a further explanation of its function.

While the invention has been described in a preferred embodiment in the foregoing, it will be easily realized by those skilled in the art that modifications may be resorted to within the scope of the appendant claims.

What we claim and desire to secure by Letters Patent is:

1. A hydraulic servo system for operating the control valve of pressure fluid operated whistles, comprising a transmitter, a receiver cooperating with said transmitter comprising a cylinder, a piston reciprocable in said cylinder, a piston rod on which said piston is slidably mounted, means operatively connecting said piston rod with said control valve, means for limiting the movement of said piston on said piston rod between two end positions, means maintaining said cylinder in communication with said transmitter on one side of said piston, a reservoir for hydraulic fluid, means maintaining said reservoir in communicaiton with said cylinder on the other side of said piston, check valve means cooperating with said piston regulating the communication between said reservoir and said transmitter through said cylinder, means resiliently biasing said piston to one of said end positions, said piston being displaceable to the other of said end positions by hydraulic fluid pressure produced in said system by said transmitter for actuating said piston rod and said control valve and said check valve means maintaining communication through said cylinder open in one end position with said reservoir and closed in said other end position.

2. A hydraulic servo system as claimed in claim 1, wherein said piston rod is provided with a bore continuously communicating with said cylinder on one side of said piston.

3. A hydraulic servo system as claimed in claim 2, wherein said piston rod is provided with an annular groove and said bore opens into said annular groove, said groove being closed by said check valve means in one end position of said piston.

4. A hydraulic servo system as claimed in claim 3, wherein an annular flange is provided on said piston rod and said annular groove is located between said flange and the surface on said piston rod upon which said piston slides, and said check valve means sealingly engaging said flange in one end position of said piston.

5. A hydraulic servo system as claimed in claim 1, wherein a sleeve is provided on said piston for slidably mounting said piston on said piston rod.

6. A hydraulic servo system as claimed in claim 1, wherein an annular flange is provided on said piston rod and said means resiliently biasing said piston comprises a pressure spring inserted between said flange and said piston.

7. A hydraulic servo system as claimed in claim 1, wherein an annular flange is provided on said piston rod, a first pressure spring means cooperating with said annular flange for biasing said piston rod in one direction, and a second pressure spring means cooperating with said flange biasing said piston rod in the opposite direction.

8. A hydraulic servo system as claimed in claim 7, wherein said piston rod has an axial bore with a radial bore continuously connecting said axial bore with said cylinder on one side of said piston, said check valve means controlling communication between the other end of said axial bore and said cylinder on the other side of said piston.

9. A hydraulic servo system as claimed in claim 1, wherein a socket protrudes into said cylinder defining an annular space therein and said piston rod is slidingly mounted in said socket.

10. A hydraulic servo system as claimed in claim 9, wherein said reservoir communicates with said annular space.

References Cited in the file of this patent

UNITED STATES PATENTS

| | | |
|---|---|---|
| 976,907 | Pagendarm | Nov. 29, 1910 |
| 2,330,678 | Carlton | Sept. 28, 1943 |

UNITED STATES PATENT OFFICE
CERTIFICATION OF CORRECTION

Patent No. 2,959,010                                          November 8, 1960

John Gustaf Mauritz Brodén et al.

It is hereby certified that error appears in the above numbered patent requiring correction and that the said Letters Patent should read as corrected below.

In the grant (only), name of first inventor, for "John Gustaf Mauritz Bordén" read -- John Gustaf Mauritz Brodén --.

Signed and sealed this 2nd day of May 1961.

(SEAL)
Attest:

ERNEST W. SWIDER
Attesting Officer

DAVID L. LADD
Commissioner of Patent